(12) United States Patent
Li et al.

(10) Patent No.: US 11,630,321 B2
(45) Date of Patent: Apr. 18, 2023

(54) CAMERA MODULE AND TERMINAL DEVICE

(71) Applicant: HUAWEI TECHNOLOGIES CO., LTD., Guangdong (CN)

(72) Inventors: Liang Li, Dongguan (CN); Li-Te Kuo, Dongguan (CN); Zhuolin Cai, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 211 days.

(21) Appl. No.: 17/225,435

(22) Filed: Apr. 8, 2021

(65) Prior Publication Data

US 2021/0223567 A1 Jul. 22, 2021

Related U.S. Application Data

(63) Continuation of application No. PCT/CN2019/115976, filed on Nov. 6, 2019.

(30) Foreign Application Priority Data

Dec. 7, 2018 (CN) .......................... 201811497066.0

(51) Int. Cl.
  *G02B 27/64* (2006.01)
  *H04N 5/225* (2006.01)
  *H04N 5/232* (2006.01)

(52) U.S. Cl.
  CPC ......... *G02B 27/646* (2013.01); *H04N 5/2252* (2013.01); *H04N 5/2253* (2013.01); *H04N 5/23248* (2013.01)

(58) Field of Classification Search
  USPC .............. 396/55; 348/208.99; 359/543, 544, 359/554–557
  See application file for complete search history.

(56) References Cited

U.S. PATENT DOCUMENTS 6,307,678 B2 * 10/2001 Kosaka .................... G03B 5/00
                                                                  359/557
8,830,335 B2 *  9/2014 Topliss .................... F03G 7/065
                                                                  359/554

(Continued)

FOREIGN PATENT DOCUMENTS

CN        102023364 A     4/2011
CN        102770804 A    11/2012
                (Continued)

*Primary Examiner* — Clayton E. LaBalle
*Assistant Examiner* — Warren K Fenwick
(74) *Attorney, Agent, or Firm* — Womble Bond Dickinson (US) LLP

(57) ABSTRACT

Embodiments of the present disclosure disclose a camera module and a terminal device, and belongs to the field of optical image stabilization technologies. The camera module includes a lens optical device and an actuating part. The actuating part includes two movable blocks, fastening brackets located on two sides of each movable block, and a plurality of electrically controlled flexible members. The lens optical device is located between the two movable blocks, and is fastened on the two movable blocks. Each movable block is suspended on the fastening brackets by using elastic members. Each movable block and the fastening brackets on the two sides are connected by the electrically controlled flexible members. The present disclosure can improve an image stabilization effect of a terminal device in a photographing process.

20 Claims, 10 Drawing Sheets

(56) References Cited

U.S. PATENT DOCUMENTS

| | | |
|---|---|---|
| 9,479,699 B2 | 10/2016 | Brown et al. |
| 9,753,300 B2 | 9/2017 | Howarth |
| 2007/0109412 A1 | 5/2007 | Hara |
| 2013/0222685 A1* | 8/2013 | Topliss ................. G02B 27/646 |
| | | 348/373 |
| 2015/0346507 A1 | 12/2015 | Howarth |
| 2017/0075192 A1* | 3/2017 | Brown ................... G03B 13/32 |
| 2017/0242225 A1 | 8/2017 | Fiske |
| 2017/0289455 A1 | 10/2017 | Hu et al. |

FOREIGN PATENT DOCUMENTS

| | | | |
|---|---|---|---|
| CN | 105629626 A | | 6/2016 |
| CN | 106405991 A | | 2/2017 |
| CN | 205961292 U | | 2/2017 |
| CN | 106990551 A | | 7/2017 |
| CN | 207283678 U | | 4/2018 |
| CN | 208060917 U | * | 11/2018 |
| CN | 208060917 U | | 11/2018 |
| CN | 208156392 U | | 11/2018 |
| JP | 2010220438 A | * | 9/2010 |

\* cited by examiner

CAMERA MODULE AND TERMINAL DEVICE

CROSS-REFERENCE TO RELATED APPLICATIONS

This application a continuation of International Application No. PCT/CN2019/115976, filed on Nov. 6, 2019, which claims priority to Chinese Patent Application No. 201811497066.0 filed on Dec. 7, 2018. The disclosures of the aforementioned applications are hereby incorporated by reference in their entireties.

TECHNICAL FIELD

This application relates to the field of optical image stabilization technologies, and in particular, to a camera module and a terminal device.

BACKGROUND

In daily lives, people often use a terminal device (for example, a smartphone or a tablet computer) to perform photographing. Therefore, photographing quality of the terminal device becomes one of important criteria for measuring the terminal device.

When a user uses a terminal device to perform photographing, a problem that a photographed photo is unclear due to a hand shake often occurs. To resolve this problem, some terminal devices have an image stabilization function. A camera module of a terminal device having this function mainly includes a lens, an actuating part, a photosensitive element, and a processor in structure. The actuating part is fastened on the lens, to move the lens under control of the processor. For a shake generated when the user uses the terminal device to perform photographing, the processor may detect a shake direction and a shake amount of the terminal device, then determine an adjustment direction and an adjustment amount of the lens based on the shake direction and the shake amount, and control the actuating part to drive the lens to perform an adjustment in a plane perpendicular to light. For example, if the user moves the terminal device toward a direction (for example, a left side) due to a shake during photographing, the processor may control the actuating part to drive the lens to move toward a direction (for example, a right side) opposite to the foregoing direction, so that the lens remains stationary relative to a scene.

The existing technology has at least the following problem:

The actuating part is limited to adjusting the lens in the plane perpendicular to light. However, the shake is an action inadvertently generated by the user, and the shake direction is not always perpendicular to a plane of light. Therefore, the actuating part has a relatively poor actuating effect on the lens, and the terminal device having the actuating part also has a relatively poor image stabilization effect.

SUMMARY

To resolve a problem in a related technology, embodiments of the present disclosure provide a camera module and a terminal device. The technical solutions are as follows:

According to a first aspect, a camera module is provided. The camera module includes a lens optical device and an actuating part. The actuating part includes two movable blocks, fastening brackets located on two sides of each movable block, and a plurality of electrically controlled flexible members. The lens optical device is located between the two movable blocks, and is fastened on the two movable blocks. Each movable block is suspended on the fastening brackets by using elastic members. Each movable block and the fastening brackets on the two sides are connected by the electrically controlled flexible members.

The movable block is a part having a specific height and width. The movable block may be a column structure having a specific height, width, and thickness. Two sides of the lens optical device 1 each are provided with one movable block. For ease of description, the two movable blocks may be denoted as a first movable block and a second movable block. The two movable blocks may be vertically placed between the fastening brackets on the two sides. The movable blocks may alternatively be horizontally placed between the fastening brackets 22 on the two sides. This embodiment does not limit a specific structure of the movable block or placement of the movable block between the fastening brackets on the two sides. The movable block may be flexibly disposed based on a space arrangement of the camera module.

In an embodiment of this application, the lens optical device is located between the two movable blocks and is fastened on the two movable blocks. In this way, the lens optical device and the two movable blocks may be used as a whole, and when the movable blocks move, the lens optical device may synchronously move with the movable blocks. To prevent the movable blocks from being interfered with by adjacent parts in a moving process, correspondingly each movable block is suspended on the fastening brackets by using the elastic members. In other words, two sides of the movable block are fastened on the fastening brackets by using the elastic members. Moreover, the movable block is not in contact with the fastening brackets. In this way, the movable block may be movably suspended on the fastening brackets, and the movable block may rotate relative to the fastening brackets.

To enable the movable blocks to translate or rotate relative to the fastening brackets, correspondingly at least two electrically controlled flexible members are connected between each movable block and the fastening brackets on the two sides. When the electrically controlled flexible members stretch or contract, because the fastening brackets cannot move and the movable blocks are in a suspended state, the electrically controlled flexible members 23 may pull or push the movable blocks connected to the electrically controlled flexible members to move relative to the fastening brackets. For example, the electrically controlled flexible members may enable the movable blocks to drive the lens optical device to translate in a plane or rotate around an axis in space.

In a possible embodiment, an upper portion of each movable block and the fastening brackets on the two sides are connected by the electrically controlled flexible members, and a lower portion of each movable block and the fastening brackets on the two sides are connected by the electrically controlled flexible members.

In an embodiment of this application, the actuating part includes eight electrically controlled flexible members, and each movable block is provided with four electrically controlled flexible members. In this arrangement of the electrically controlled flexible members, the lens optical device can rotate around three rotation axes by using a minimum quantity of electrically controlled flexible members. This reduces arrangement space.

In a possible embodiment, each electrically controlled flexible member includes a movable block connector, a support connector, and a flexible wire connecting the movable block connector and the support connector. A height of a movable block connector located on the upper portion of the movable block is higher than a height of a support connector of an electrically controlled flexible member to which the movable block connector belongs, and a height of a movable block connector located on the lower portion of the movable block is lower than a height of a support connector of an electrically controlled flexible member to which the movable block connector belongs.

In an embodiment of this application, a height of a movable block connector r is higher than a height of a support connector t, and a height of a movable block connector s is lower than a height of a support connector u. The movable block connector r is located on the upper portion of the movable block. A support connector of an electrically controlled flexible member to which the movable block connector r belongs is the support connector t. The movable block connector s is located on the lower portion of the movable block. A support connector of an electrically controlled flexible member to which the movable block connector s belongs is the support connector u.

Alternatively, a height of a movable block connector a is higher than a height of a support connector d, and a height of a movable block connector b is lower than a height of a support connector c. The movable block connector a is located on the upper portion of the movable block. A support connector of an electrically controlled flexible member to which the movable block connector a belongs is the support connector d. The movable block connector b is located on the lower portion of the movable block. A support connector of an electrically controlled flexible member to which the movable block connector b belongs is the support connector c.

In an embodiment, a flexible wire of an electrically controlled flexible member located on the upper portion of the movable block tilts downward, and a flexible wire of an electrically controlled flexible member located on the lower portion of the movable block tilts upward.

In a possible embodiment, in two support connectors located on a same fastening bracket, a height of a first support connector is lower than a height of a second support connector. The first support connector and a movable block connector located on the upper portion of the movable block belong to a same electrically controlled flexible member. The second support connector and a movable block connector located on the lower portion of the movable block belong to a same electrically controlled flexible member.

In an embodiment of this application, a height of a support connector t is lower than a height of a support connector u. A movable block connector r is located on the upper portion of the movable block, and the movable block connector r and the support connector t belong to a same electrically controlled flexible member. A movable block connector s is located on the lower portion of the movable block, and the movable block connector s and the support connector u belong to a same electrically controlled flexible member 23.

When the flexible wire of the electrically controlled flexible member is a shape memory alloy (SMA) wire, four SMA wires between the movable block and the fastening brackets are disposed in a cross manner, in other words, in a layout manner of SMA wires of electrically controlled flexible members, so that rotation of the lens optical device can be better controlled, and arrangement space can be reduced. This is because the SMA wire usually has a relatively small deformation amount. To increase the deformation amount of the SMA wire without damaging the SMA wire, the SMA wire needs to be long enough. In an embodiment, the layout manner of SMA wires allows the SMA wire to be longer. Therefore, in the layout manner of the SMA wires of the electrically controlled flexible members, rotation of the lens optical device can be better controlled, and arrangement space can be reduced.

In a possible embodiment, for two electrically controlled flexible members between each movable block and a fastening bracket on one side, a flexible wire of an electrically controlled flexible member connected to the upper portion of the movable block is not in contact with a flexible wire of an electrically controlled flexible member connected to the lower portion of the movable block.

In an embodiment of this application, a plane in which a flexible wire of a first electrically controlled flexible member and a flexible wire of a fourth electrically controlled flexible member are located is parallel to a plane in which a flexible wire of a second electrically controlled flexible member and a flexible wire of a third electrically controlled flexible member are located, there is a gap between the two planes, and a value of the gap is a preset value. In this way, when the first electrically controlled flexible member and the fourth electrically controlled flexible member are powered on and contract, but the second electrically controlled flexible member 232 and the third electrically controlled flexible member are not powered on and do not contract, the flexible wire of the second electrically controlled flexible member does not interfere with a force exerted by the first electrically controlled flexible member on the movable block, and the flexible wire of the third electrically controlled flexible member does not interfere with a force exerted by the fourth electrically controlled flexible member on the movable block.

In a possible embodiment, each electrically controlled flexible member includes a movable block connector, a support connector, and a flexible wire connecting the movable block connector and the support connector. A height of a movable block connector located on the upper portion of the movable block is lower than a height of a support connector of an electrically controlled flexible member to which the movable block connector belongs, and a height of a movable block connector located on the lower portion of the movable block is higher than a height of a support connector of an electrically controlled flexible member to which the movable block connector belongs.

In an embodiment of this application, a height of a movable block connector j is lower than a height of a support connector i. The movable block connector j is located on the upper portion of the movable block. A support connector of an electrically controlled flexible member to which the movable block connector j belongs is the support connector i. A height of a movable block connector k is higher than a height of a support connector m. The movable block connector k is located on the lower portion of the movable block. A support connector of an electrically controlled flexible member to which the movable block connector k belongs is the support connector m.

In all the layout manners of the electrically controlled flexible members, when the flexible wires of the electrically controlled flexible members contract, the movable blocks can drive the lens optical device 1 to rotate around any rotation axis in three-dimensional space.

In a possible embodiment, the flexible wire is a shape memory alloy wire.

In an embodiment of this application, the flexible wire of the electrically controlled flexible member may be a shape memory alloy wire, which may be referred to as an SMA wire for short. When a processor powers on the electrically controlled flexible member, in a power-on state, the flexible wire of the electrically controlled flexible member is heated to a higher temperature, and then contracts and exerts a pull force on the movable block. When the flexible wire of the electrically controlled flexible member is an SMA wire, a structure is simple, and fewer parts are used, so that a quantity of parts of the camera module can be reduced, and less internal space of a terminal device is occupied, and therefore the terminal device is lighter and thinner.

In a possible embodiment, each elastic member is a metal elastic member, each movable block connector and each support connector are conductive terminals, and each elastic member is electrically connected to a movable block connector on a same side.

In an embodiment of this application, when the flexible wire is an SMA wire, both the movable block connector and the support connector are conductive terminals, and the movable block connector located on the movable block may be grounded. To reduce arrangement space, the elastic member may be a metal elastic member, each elastic member is electrically connected to a movable block connector on a same side, and then the elastic member is electrically connected to a ground end on a substrate of the camera module. In this way, the movable block connector is grounded, and the arrangement space is reduced. Instead of additionally connecting the movable block connector to a ground wire, the metal elastic member 3 can be directly used.

In a possible embodiment, elastic members on the two sides of each movable block are symmetric relative to a plumb line of the movable block.

In an embodiment of this application, the elastic members on the two sides of each movable block have a same shape, structure, and elastic coefficient. In this way, the two sides of the movable block are respectively fastened on the fastening brackets by using the identical elastic members. Therefore, when the electrically controlled flexible members are not powered on, the movable blocks do not tilt between the fastening brackets on the two sides, and each movable block is secured between the two fastened fastening brackets, thereby improving stability of the lens optical device.

In a possible embodiment, the lens optical device includes a reflector and a reflector mounting base, and the reflector is mounted on the reflector mounting base. The reflector mounting base is located between the two movable blocks, and is fastened on the two movable blocks.

In an embodiment of this application, the lens optical device may include a reflector and a reflector mounting base. The reflector may be a reflector plate or may be a prism. The reflector is mounted on the reflector mounting base, the reflector mounting base is located between the two movable blocks, and two opposite side walls of the reflector mounting base are respectively fastened on the two movable blocks. The reflector mounting base of the reflector can protect the reflector.

In a possible embodiment, the actuating part further includes an elastic limiting member. Two ends of the elastic limiting member are respectively fastened on two fastening brackets, and a middle portion of the elastic limiting member is fastened on the reflector mounting base.

In an embodiment of this application, during implementation, a structure of the elastic limiting member may include a first fastener, a second fastener, and a third fastener. The first fastener of the elastic limiting member is fastened on a fourth fastening bracket. The second fastener of the elastic limiting member is fastened on a second fastening bracket. The third fastener of the elastic limiting member is fastened on a surface that is of the reflector mounting base and that is opposite to the reflector. In this way, the lens optical device is fastened by using four elastic members and one elastic limiting member, and the two movable blocks and the lens optical device between the two movable blocks are used as a whole, which is fastened and supported at three positions by using the elastic members. According to triangular stability, this can improve stability of the lens optical device when the electrically controlled flexible members are not powered on, and avoid shaking of the lens optical device.

In a possible embodiment, the camera module further includes a processor.

The processor is electrically connected to each electrically controlled flexible member, and is configured to: after detecting that a photographing function of a terminal device is enabled, for each preset period, obtain displacement information and posture change information of the terminal device in the current period; determine a control current value of each electrically controlled flexible member based on the displacement information and the posture change information; and control, based on the control current value of each electrically controlled flexible member 23, the electrically controlled flexible member to stretch or contract.

The displacement information is information about a change of a location of the terminal device in a plane, for example, how far the terminal device is translated toward a direction in a plane. For example, the terminal device is translated one millimeter to the left in a plane perpendicular to a light axis. The posture change information is information about a change of a posture of the terminal device in space, for example, an angle by which the terminal device rotates around an axis in space. A change caused to the terminal device by a shake generated when a user holds the terminal device to perform photographing is a result combining the displacement information and the posture change information of the terminal device.

The control current value may be a control signal corresponding to a relatively large current, or may be a control signal corresponding to a relatively small current, or may be a control signal corresponding to a zero current. In this way, a current supplied to an electrically controlled flexible member that is to stretch or contract may be a current with a relatively large value, and a current supplied to an electrically controlled flexible member that does not stretch or contract may be a current with a relatively small value or a zero current.

In the solution shown in this embodiment of this application, after obtaining the displacement information and the posture change information of the terminal device in the current period, the processor may determine the control current value of each electrically controlled flexible member based on the displacement information and the posture change information. Then, the processor may control a value of a current supplied by a power supply part of the camera module or a power supply part of the terminal device to each electrically controlled flexible member 23.

In a possible embodiment, the camera module further includes a processor. The processor is electrically connected to each electrically controlled flexible member, and is configured to: after detecting that a photographing function of a terminal device is enabled, for each preset period, obtain displacement information and posture change information of the terminal device in the current period; determine a first displacement component of the displacement information in a preset first direction, a second displacement component of the displacement information in a preset second direction, and a third displacement component of the displacement information in a preset third direction, and determine a first rotation angle component of the posture change information on a preset first rotation axis, a second rotation angle component of the posture change information on a preset second rotation axis, and a third rotation angle component of the posture change information on a preset third rotation axis, where the first direction, the second direction, and the third direction are perpendicular to each other, the first rotation axis, the second rotation axis, and the third rotation axis are perpendicular to each other, the first direction is perpendicular to the first rotation axis, the second direction is perpendicular to the second rotation axis, and the third direction is perpendicular to the third rotation axis; determine a first compensation rotation angle on the first rotation axis based on the first displacement component and the first rotation angle component, determine a second compensation rotation angle on the second rotation axis based on the second displacement component and the second rotation angle component, and determine a third compensation rotation angle on the third rotation axis based on the third displacement component and the third rotation angle component; and determine a control current value of each electrically controlled flexible member based on the first compensation rotation angle, the second compensation rotation angle, and the third compensation rotation angle, and control, based on the control current value of each electrically controlled flexible member 23, the electrically controlled flexible member to stretch or contract.

The first displacement component, the second displacement component, and the third displacement component are vectors that have positive and negative signs, and the positive and negative signs represent translation directions. For example, the first displacement component in the first direction is either along the first direction or along a direction opposite to the first direction. Similarly, the first rotation angle component, the second rotation angle component, and the third rotation angle component also have positive and negative signs, and the positive and negative signs represent rotation directions. For example, the first rotation angle component on the first rotation axis is either an angle clockwise around the first rotation axis or an angle counterclockwise around the first rotation axis.

A rotation angle and a compensation rotation angle are opposite to each other, directions of the two angles are opposite, and values of the two angles are equal. For example, the rotation angle is an angle clockwise around a rotation axis, and the compensation rotation angle is an angle counterclockwise around the rotation axis.

In an embodiment of this application, the processor determines a corresponding first displacement rotation angle based on the first displacement component, then performs a vector operation on the first displacement rotation angle and the first rotation angle component, and after the vector operation, obtains an opposite number for an obtained angle, to obtain the first compensation rotation angle on the first rotation axis. For example, if rotation directions of the two angles are consistent, an addition operation is performed; if rotation directions of the two angles are opposite, a subtraction operation is performed. In this way, an angle $\beta$ may be obtained after the vector operation. Then the processor determines a negative $\beta$ as a compensation rotation angle, to obtain the first compensation rotation angle on the first rotation axis. Similarly, the second compensation rotation angle on the second rotation axis and the third compensation rotation angle on the third rotation axis may be obtained.

Then, the processor may determine the control current value of each electrically controlled flexible member based on the first compensation rotation angle, the second compensation rotation angle, and the third compensation rotation angle, and control, based on the control current value of each electrically controlled flexible member 23, the electrically controlled flexible member to stretch or contract. For example, the processor may control a power supply part of the camera module to supply a current of amperes to the first electrically controlled flexible member, supply a current of 1 ampere to the second electrically controlled flexible member, supply a current of amperes to the third electrically controlled flexible member, supply a current of 1 ampere to the fourth electrically controlled flexible member, supply a current of 10 amperes to a fifth electrically controlled flexible member, supply a current of 1 ampere to a sixth electrically controlled flexible member, supply a current of 10 amperes to a seventh electrically controlled flexible member, and supply a current of 1 ampere to an eighth electrically controlled flexible member.

According to a second aspect, a terminal device is provided. The terminal device includes a middle frame, a mainboard, a rear cover, a display screen, a battery, and the foregoing camera module. The mainboard, the battery, and the camera module are all mounted on the middle frame. The display screen is mounted on a first surface of the middle frame. The rear cover is mounted on a second surface of the middle frame. The first surface is opposite to the second surface. The mainboard is electrically connected to the display screen, the battery, and the camera module.

The middle frame is a main frame of the terminal device, and is configured to receive parts of the terminal device. For example, the mainboard, the battery, the camera module, the rear cover, and the display screen may all be mounted on the middle frame.

In an embodiment of this application, the mainboard may be mounted at a top portion of the middle frame, and the battery is mounted at a middle portion of the middle frame. The camera module may be mounted on the mainboard, or may be mounted on the middle frame. To reduce a thickness of the terminal device, the camera module may be mounted on the middle frame. Specifically, a mounting port that matches the camera module may be disposed on the mainboard, and the camera module may be located in the mounting port and mounted on the middle frame.

In an embodiment, the display screen and the rear cover are respectively mounted on two opposite surfaces of the middle frame. For example, for a mobile phone, a tablet computer, or the like, the display screen may be mounted on a front side of the middle frame, and the rear cover may be mounted on a rear side of the middle frame.

In electrical connection relationship, the mainboard is electrically connected to the display screen, the battery, and the camera module, and the battery is electrically connected to the display screen and the camera module to supply power to the display screen and the camera module.

The technical solutions provided in the embodiments of the present disclosure bring the following beneficial effects:

In the embodiments of the present disclosure, the camera module of the terminal device may include a lens optical device and an actuating part. The actuating part includes two movable blocks, fastening brackets located on two sides of each movable block, and a plurality of electrically controlled flexible members. The lens optical device is located between the two movable blocks and is fastened on the two movable blocks. Each movable block is suspended on the fastening brackets by using elastic members. Each movable block and the fastening brackets on the two sides are connected by the electrically controlled flexible members. In this way, when the terminal device having the camera module is used to perform photographing, a processor of the terminal device may control, based on a location change status and a rotation status that are generated when the terminal device is shaken, the electrically controlled flexible members to stretch or contract to push or pull the movable blocks to move, so that the movable blocks can drive the lens optical device to rotate in space. This actuating part for adjusting the lens optical device has a relatively good actuating effect, thereby improving an image stabilization effect of the terminal device in a photographing process.

Description of reference numerals

Reference numerals of camera module

Figure 1:
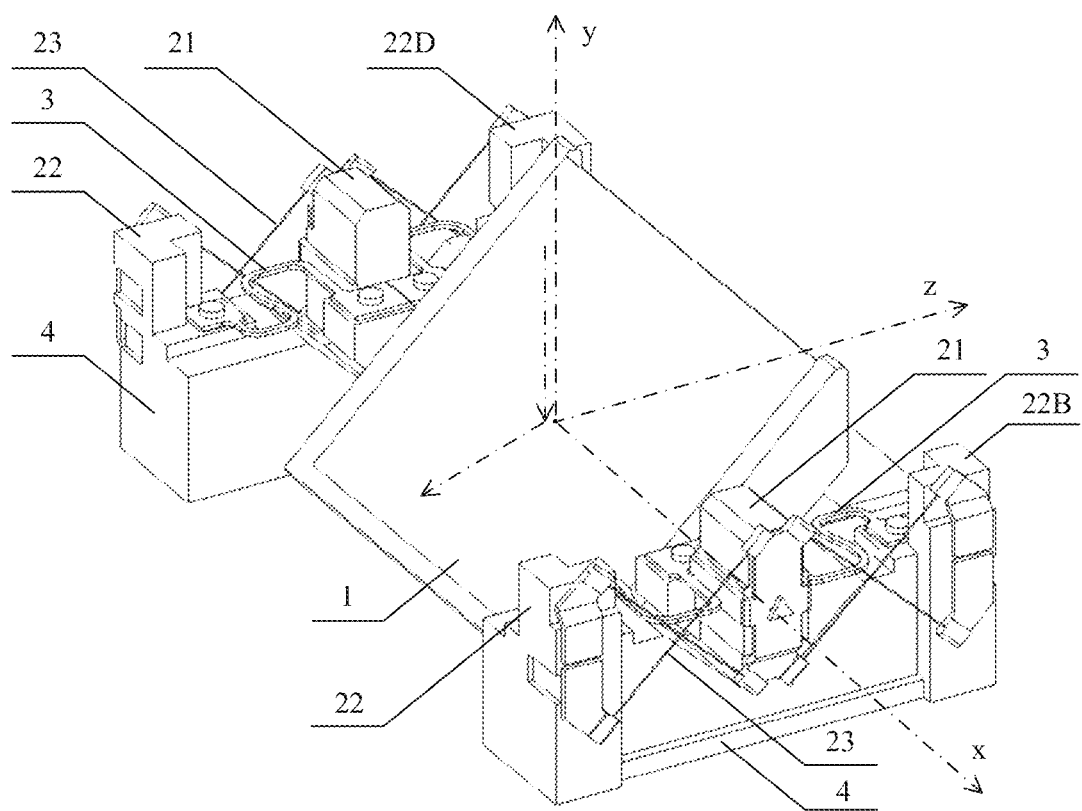
FIG. 1 is a schematic structural diagram of a camera module according to an embodiment.

1. Lens optical device
2. Actuating part
3. Elastic member
5. Elastic limiting member
11. Reflector
12. Reflector mounting base
21. Movable block Description of reference numerals 22. Fastening bracket
23. Electrically controlled flexible member
24. Main frame
51. First fastener
52. Second fastener
53. Third fastener
231. First electrically controlled flexible member
232. Second electrically controlled flexible member
233. Third electrically controlled flexible member
234. Fourth electrically controlled flexible member
235. Fifth electrically controlled flexible member
236. Sixth electrically controlled flexible member
237. Seventh electrically controlled flexible member
238. Eighth electrically controlled flexible member
241. Base
242. Groove
21A. First movable block
21B. Second movable block
22A. First fastening bracket
22B. Second fastening bracket
22C. Third fastening bracket
23D. Fourth fastening bracket Reference numerals of terminal device 10. Middle frame
20. Mainboard
30. Rear cover
40. Display screen
50. Battery
60. Camera module
201. Mounting port

DESCRIPTION OF EMBODIMENTS

An embodiment of the present disclosure provides a camera module. The camera module may be an independent terminal device, for example, may be an independent camera. Alternatively, the camera module may be a part of a terminal device having a photographing function, for example, may be a part of a smartphone, a tablet computer, or the like.

As shown in FIG. 1, the camera module includes a lens optical device 1 and an actuating part 2. The actuating part 2 includes two movable blocks 21, fastening brackets 22 located on two sides of each movable block 21, and a plurality of electrically controlled flexible members 23. The lens optical device 1 is located between the two movable blocks 21, and is fastened on the two movable blocks 21. Each movable block 21 is suspended on the fastening brackets 22 by using elastic members 3. Each movable block 21 and the fastening brackets 22 on the two sides are connected by the electrically controlled flexible members 23.

Figure 2:
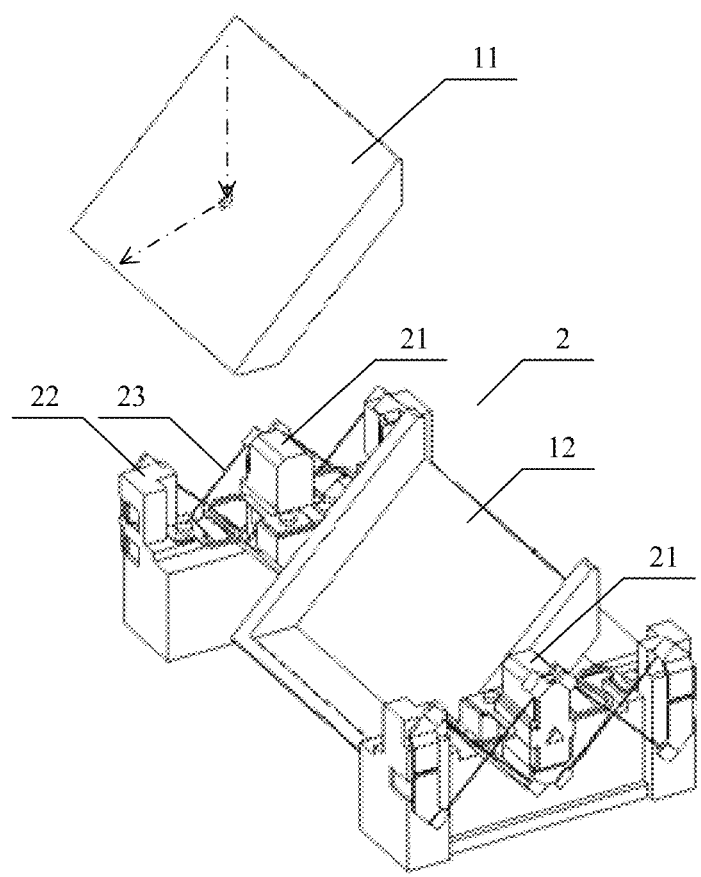
FIG. 2 is a schematic structural diagram of a camera module according to an embodiment.
Figure 3:
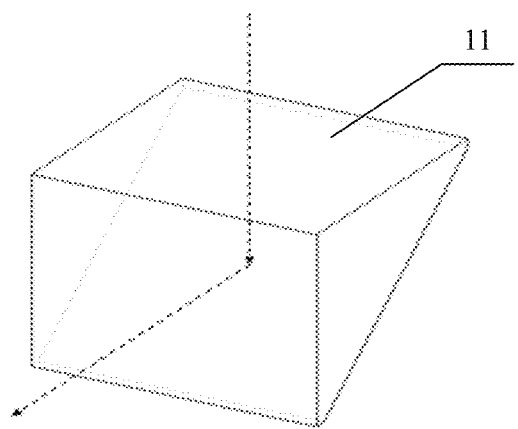
FIG. 3 is a schematic structural diagram of a reflector of a lens optical device according to an embodiment.

As shown in FIG. 2, in an embodiment, the lens optical device 1 may include a reflector 11 and a reflector mounting base 12. The reflector 11 may be a reflector plate shown in FIG. 1 and FIG. 2, or may be a prism shown in FIG. 3. The reflector 11 is mounted on the reflector mounting base 12, the reflector mounting base 12 is located between the two movable blocks 21, and two opposite side walls of the reflector mounting base 12 are respectively fastened on the two movable blocks 21. The reflector 11 is mounted on the reflector mounting base 12, the reflector mounting base 12 is located between the two movable blocks 21, and two opposite side walls of the reflector mounting base 12 are respectively fastened on the two movable blocks 21. The reflector mounting base 12 of the lens optical device 1 may alternatively belong to the actuating part 2. For example, the two opposite side walls of the reflector mounting base 12 and the movable blocks 21 may be integrally formed. A manner of fastening the reflector 11, the reflector mounting base 12, and the movable blocks 21 is not limited in this embodiment, provided that the three can move together, or in other words, the three cannot move relative to each other.

As shown in FIG. 1 and FIG. 2, light enters the camera module along an incident path indicated by an arrow, and is reflected by the reflector 11 of the lens optical device 1, and then propagated along a reflection path indicated by an arrow. Central axes of a light filter and a photosensitive element of the camera module may be located on the reflection path.

Figure 4:
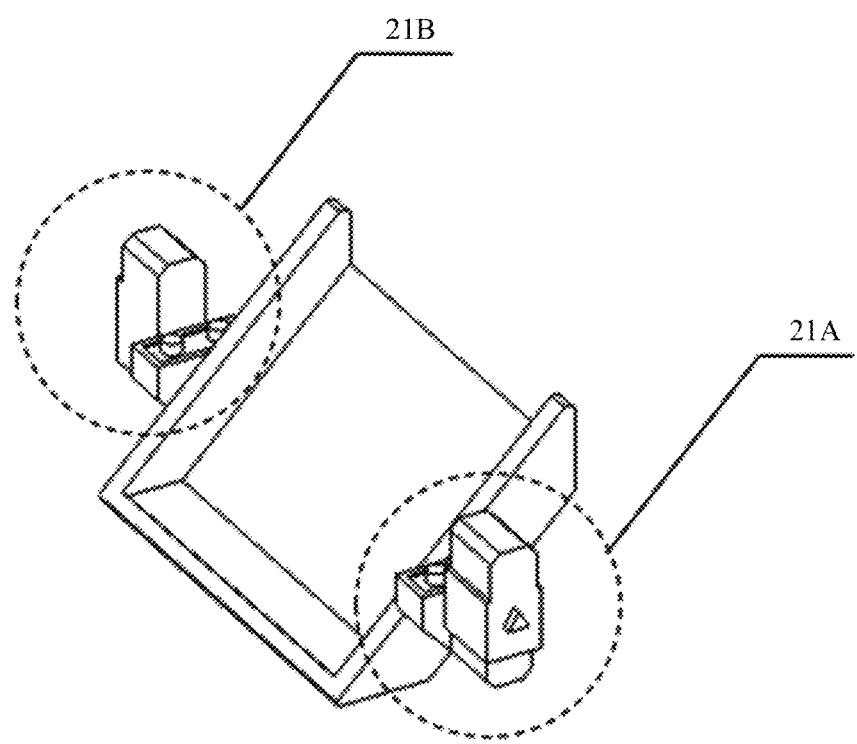
FIG. 4 is a schematic structural diagram of a movable block of an actuating part according to an embodiment.
Figure 5:
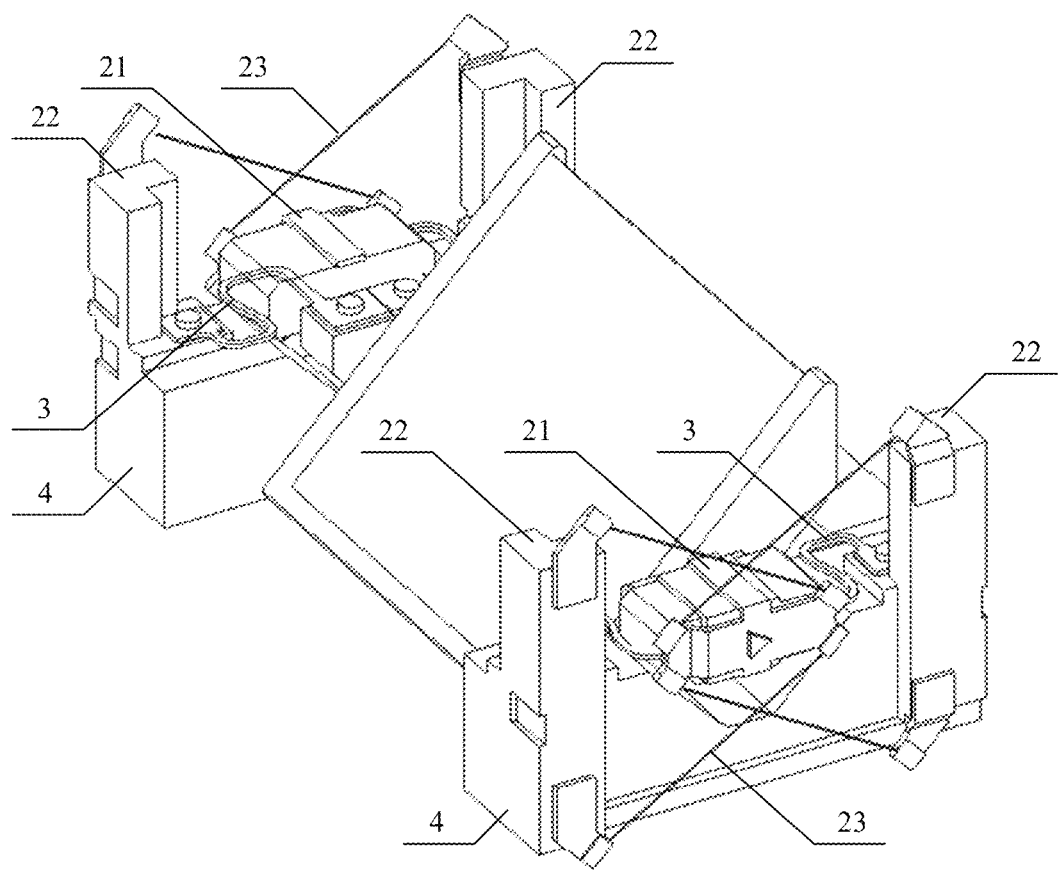
FIG. 5 is a schematic structural diagram of a camera module according to an embodiment.

The movable block 21 is a part having a specific height and width. As shown in FIG. 4, the movable block 21 may be a column structure having a specific height, width, and thickness. Two sides of the lens optical device 1 each are provided with one movable block 21. For ease of description, the two movable blocks 21 may be denoted as a first movable block 21A and a second movable block 21B. As shown in FIG. 1 and FIG. 2, the two movable blocks 21 may be vertically placed between the fastening brackets 22 on the two sides. As shown in FIG. 5, the movable blocks 21 may alternatively be horizontally placed between the fastening brackets 22 on the two sides. This embodiment does not limit a specific structure of the movable block 21 or placing of the movable block 21 between the fastening brackets 22 on the two sides. The movable block 21 may be flexibly disposed based on a space arrangement of the camera module.

In an embodiment, as shown in FIG. 1, FIG. 2, and FIG. 5, the lens optical device 1 is located between the two movable blocks 21 and is fastened on the two movable blocks 21. In this way, the lens optical device 1 and the two movable blocks 21 may be used as a whole, and when the movable blocks 21 move, the lens optical device 1 may synchronously move with the movable blocks 21. To prevent the movable blocks 21 from being interfered with by adjacent components in a moving process, correspondingly each movable block 21 is suspended on the fastening brackets 22 by using the elastic members 3. In other words, two sides of the movable block 21 are fastened on the fastening brackets 22 by using the elastic members 3. Moreover, the movable block 21 is not in contact with the fastening brackets 22. In this way, the movable block 21 may be movably suspended on the fastening brackets 22, and the movable block 21 may rotate relative to the fastening brackets 22.

In an embodiment, to secure each movable block 21 between the fastening brackets 22 on the two sides, correspondingly, as shown in FIG. 1, elastic members 3 on the two sides of each movable block 21 are symmetric relative to a plumb line of the movable block 21.

In an embodiment, the elastic members 3 on the two sides of each movable block 21 have a same shape, structure, and elastic coefficient. In this way, the two sides of the movable block 21 are respectively fastened on the fastening brackets 3 by using the identical elastic members 3. Therefore, when the electrically controlled flexible members 23 are not powered on, the movable blocks 21 do not tilt between the fastening brackets 22 on the two sides, and each movable block 21 is secured between the two fastened fastening brackets 22, thereby improving stability of the lens optical device 1.

In an embodiment, because the two movable blocks 21 and the lens optical device 1 between the two movable blocks 21 are in a suspended state, when the electrically controlled flexible members 23 are not powered on, to further improve stability of the lens optical device 1, correspondingly the actuating part 2 further includes an elastic limiting member 5. Two ends of the elastic limiting member 5 are respectively fastened on two fastening brackets 22, and a middle portion of the elastic limiting member 5 is fastened on the reflector mounting base 12.

Figure 6:
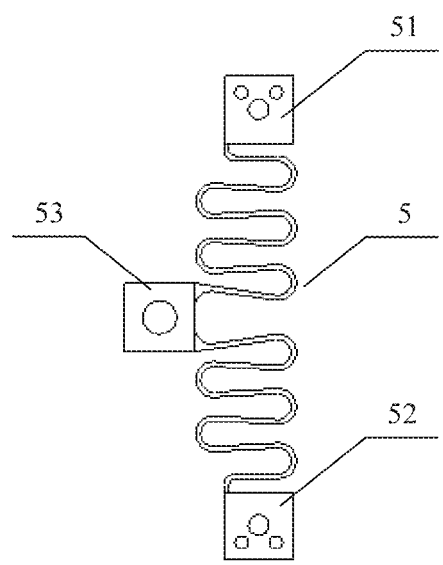
FIG. 6 is a schematic structural diagram of an elastic member according to an embodiment.

In an embodiment, a structure of the elastic limiting member 5 may be shown in FIG. 6, including a first fastener 51, a second fastener 52, and a third fastener 53. The first fastener 51 of the elastic limiting member 5 is fastened on a fourth fastening bracket 22D shown in FIG. 1. The second fastener 52 of the elastic limiting member 5 is fastened on a second fastening bracket 22B shown in FIG. 1. The third fastener 53 of the elastic limiting member 5 is fastened on a surface that is of the reflector mounting base 12 shown in FIG. 2 and that is opposite to the reflector 11. In this way, the lens optical device 1 is fastened by using four elastic members 3 and one elastic limiting member 5, and the two movable blocks 21 and the lens optical device 1 between the two movable blocks 21 are used as a whole, which is fastened and supported at three positions by using the elastic members. According to triangular stability, this can improve stability of the lens optical device 1 when the electrically controlled flexible members 23 are not powered on, and avoid shaking of the lens optical device 1.

The elastic member 3 and the elastic limiting member 5 may be elastic members with elastic coefficients within a preset value range. If the elastic coefficients of the elastic member 3 and the elastic limiting member 5 are excessively small, stability of the movable blocks 21 and the lens optical device 1 is relatively poor. If the elastic coefficients are excessively large, mobility of the movable blocks 21 and the lens optical device 1 relative to the fastening brackets 22 is relatively poor. The elastic coefficients of the elastic member 3 and the elastic limiting member 5 may be determined based on theoretical analysis and repeated tests, to ensure that the movable blocks 21 and the lens optical device 1 are not only stable, but also movable relative to the fastening brackets 22. The elastic member 3 may be a bent spring shown in FIG. 1, or may be a spring. For example, both sides and a bottom portion of the movable block 21 are mounted on adjacent fastening brackets 22 by using springs.

Figure 7:
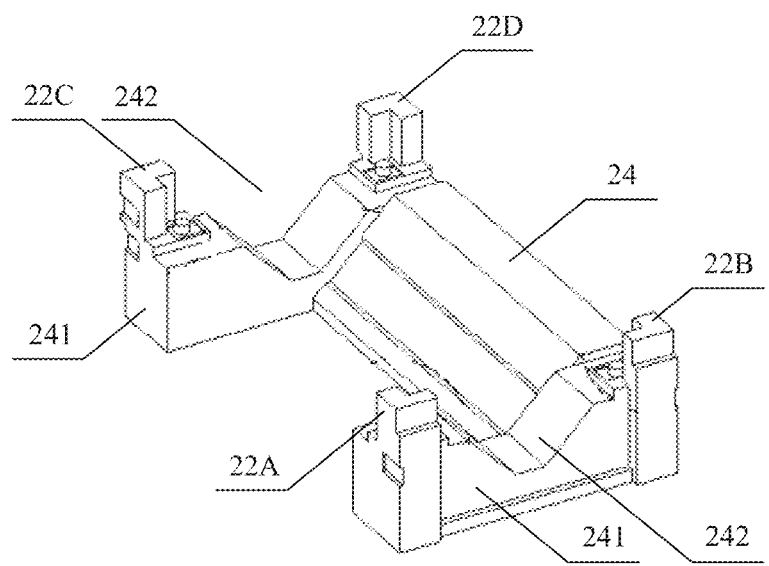
FIG. 7 is a schematic structural diagram of a main frame of an actuating part according to an embodiment.

In an embodiment, the fastening brackets 22 may be brackets fastened on the two sides of the movable block 21 to fasten the movable block 21. For example, the camera module may include a substrate, and the fastening brackets 22 may be brackets fastened on the substrate. For another example, the camera module may include a substrate, the actuating part 2 includes a base, the base of the actuating part 2 is mounted on the substrate, and the brackets are fastened on the base. For example, as shown in FIG. 7, the actuating part 2 includes a main frame 24, the main frame 24 includes two bases 241, and each base 241 is provided with a groove 242. Two groove walls of the groove 242 are the fastening brackets 22 on the two sides of the movable block 21. The movable block 21 may be suspended in the groove 242 of the base 4 by using the elastic members 3. The movable block 21 is not in contact with the groove walls or a groove bottom of the groove 242. For another example, the actuating part 2 may alternatively include only one base, a groove having a specific length is disposed on the base, the two movable blocks 21 and the lens optical device 1 are all located in the groove, and groove walls of the groove are the fastening brackets 22 on the two sides of each movable block 21. A specific structure of the fastening brackets 22 on the two sides of each movable block 21 is not limited in this embodiment, provided that the movable block 21 can be supported and secured. A person skilled in the art may select proper fastening brackets depending on space layout of a terminal device.

To enable the movable blocks 21 to translate or rotate relative to the fastening brackets 22, correspondingly at least two electrically controlled flexible members 23 are connected between each movable block 21 and the fastening brackets 22 on the two sides. When the electrically controlled flexible members 23 stretch or contract, because the fastening brackets 22 cannot move and the movable blocks 21 are in a suspended state, the electrically controlled flexible members 23 may pull or push the movable blocks 21 connected to the electrically controlled flexible members 23 to move relative to the fastening brackets 22. For example, the electrically controlled flexible members 23 may enable the movable blocks 21 to drive the lens optical device 1 to translate in a plane or rotate around an axis in space.

The electrically controlled flexible member 23 is a part that may stretch or contract in a power-on state, and a structure of the electrically controlled flexible member 23 may have at least the following several cases:

In an embodiment, the electrically controlled flexible member 23 may include a movable block connector located on the movable block 21, a support connector located on the fastening bracket 22, and a flexible rod connecting the movable block connector and the support connector.

In an embodiment, a processor may control the flexible rod to stretch or contract. When the processor controls the flexible rod to stretch, a force exerted by the flexible rod on the movable block 21 is a thrust. When the processor controls the flexible rod to contract, a force exerted by the flexible rod on the movable block 21 is a pull force.

In an embodiment, the electrically controlled flexible member 23 may include a movable block connector located on the movable block 21, a support connector located on the fastening bracket 22, and a flexible wire connecting the movable block connector and the support connector.

In an embodiment, a processor may control the flexible wire to stretch or contract. When the processor controls the flexible wire to contract, a force exerted by the flexible wire on the movable block 21 is a pull force.

In an embodiment, if the electrically controlled flexible member 23 includes a flexible wire, the flexible wire may alternatively be a rope. In this case, the electrically controlled flexible member 23 may further include an electric winch, and the flexible wire may be disposed on an output shaft of the electric winch. In this way, when the electric winch retracts the rope, the rope exerts a pull force on the movable block 21.

In an embodiment, if the electrically controlled flexible member 23 includes a flexible wire, the flexible wire may be a shape memory alloy wire, which may be referred to as an SMA wire for short. When the processor powers on the electrically controlled flexible member 23, in a power-on state, the flexible wire of the electrically controlled flexible member 23 is heated to a higher temperature, and then contracts and exerts a pull force on the movable block 21.

When the flexible wire is an SMA wire, both the movable block connector and the support connector are conductive terminals, and the movable block connector located on the movable block 21 may be grounded. To reduce arrangement space, the elastic member 3 may be a metal elastic member, each elastic member 3 is electrically connected to a movable block connector on a same side, and then the elastic member 3 is electrically connected to a ground end on a substrate of the camera module.

When the flexible wire of the electrically controlled flexible member 23 is an SMA wire, a structure is simple, and fewer parts are used, so that a quantity of parts of the camera module can be reduced, and less internal space of a terminal device is occupied, and therefore the terminal device is lighter and thinner.

In an embodiment, provided that the electrically controlled flexible member 23 can exert a force on the movable block 21, this does not limit whether the exerted force is a thrust or a pull force, nor limits a manner in which the electrically controlled flexible member 23 exerts the force on the movable block 21. For ease of description, the following uses an example that the flexible wire of the electrically controlled flexible member 23 is an SMA wire and exerts a pull force on the movable block 21. A case in which the electrically controlled flexible member 23 exerts a thrust or exerts a combined force of a thrust and a pull force on the movable block 21 is similar thereto, and details are not described again.

Based on the foregoing structure, when the electrically controlled flexible members 23 of the actuating part 2 stretch or contract, the movable blocks 21 are pulled or pushed to drive the lens optical device 1 to move, to compensate for displacement or rotation caused by a shake when the terminal device is used to perform photographing. In an embodiment, the camera module may further include a processor. The processor is electrically connected to each electrically controlled flexible member 23, and is configured to: after detecting that a photographing function of the terminal device is enabled, for each preset period, obtain displacement information and posture change information of the terminal device in the current period; determine a control current value of each electrically controlled flexible member 23 based on the displacement information and the posture change information; and control, based on the control current value of each electrically controlled flexible member 23, the electrically controlled flexible member 23 to stretch or contract.

The displacement information is information about a change of a location of the terminal device in a plane, for example, how far the terminal device is translated toward a direction in a plane. For example, the terminal device is translated one millimeter to the left in a plane perpendicular to a light axis. The posture change information is information about a change of a posture of the terminal device in space, for example, an angle by which the terminal device rotates around an axis in space. A change caused to the terminal device by a shake generated when a user holds the terminal device to perform photographing is a result combining the displacement information and the posture change information of the terminal device.

The photographing function is enabled as follows: The user taps a camera application on the terminal device and enters a photographing mode.

The control current value may be a control signal corresponding to a relatively large current, or may be a control signal corresponding to a relatively small current, or may be a control signal corresponding to a zero current. In this way, a current supplied to an electrically controlled flexible member 23 that is to stretch or contract may be a current with a relatively large value, and a current supplied to an electrically controlled flexible member 23 that does not stretch or contract may be a current with a relatively small value or a zero current.

In an embodiment, after detecting that the terminal device enables the photographing function, the processor may periodically obtain the displacement information and the posture change information of the terminal device in the current period. A detection part such as a gyroscope may be mounted on the terminal device. The detection part may periodically send the displacement information and the posture change information of the terminal device in the current period to the processor. Alternatively, the detection part may periodically send location information and posture of the terminal device in the current period to the processor, and the processor determines the displacement information and the posture change information of the terminal device in the current period based on the received location information and posture. Then, the processor may determine the control current value of each electrically controlled flexible member 23 based on the displacement information and the posture change information. Finally, the processor may control, based on the control current value of each electrically controlled flexible member 23, at least two electrically controlled flexible members 23 to stretch or contract. A process in which the processor controls the actuating part 2 to drive the lens optical device 1 to rotate is described below in detail.

In this way, because a translation change is also generated in a rotation process, in a process in which the actuating part 2 drives the lens optical device 1 to rotate in space, a translation change and a rotation change of the terminal device that are caused by a shake can be compensated for. It can be learned that an adjustment effect of this actuating part 2 on the lens optical device 1 is better. Therefore, when the user uses the terminal device to perform photographing, the actuating part 2 drives the lens optical device 1 to rotate, so that the translation change of the terminal device can be compensated for, and the rotation change of the terminal device can be compensated for. In this way, the lens optical device 1 and a photographed scene can be stationary to each other, thereby improving a definition of a photo photographed by the terminal device.

In an embodiment, because a shake of the terminal device is uncertain, the shake may make the terminal device rotate around any axis in space. To enable the lens optical device 1 to rotate around any rotation axis in space, correspondingly the lens optical device 1 needs to rotate around three rotation axes that are perpendicular to each other to rotate around any rotation axis in space, because any rotation axis in space can be decomposed into the three rotation axes that are perpendicular to each other. To enable the two movable blocks 21 to drive the lens optical device 1 to rotate around the three rotation axes (which may be denoted as a first rotation axis, a second rotation axis, and a third rotation axis) that are perpendicular to each other, correspondingly several electrically controlled flexible members 23 may be disposed between the movable block 21 and the fastening brackets 22, to enable the lens optical device 1 to rotate around the first rotation axis; several electrically controlled flexible members 23 may be disposed between the movable block 21 and the fastening brackets 22, to enable the lens optical device 1 to rotate around the second rotation axis; and several electrically controlled flexible members 23 may be disposed between the movable block 21 and the fastening brackets 22, to enable the lens optical device 1 to rotate around the third rotation axis.

To describe the three rotation axes more intuitively, it may be assumed that an x axis shown in FIG. 1 represents the first rotation axis, a y axis shown in FIG. 1 represents the second rotation axis, and a z axis shown in FIG. 1 represents the third rotation axis. In the figure, the x axis, the y axis, and the z axis are provided merely for ease of description, and do not constitute any specific limitation.

To reduce arrangement space so that the lens optical device 1 can rotate around the three rotation axes by using a minimum quantity of electrically controlled flexible members 23, in a feasible manner, the flexible wire of the electrically controlled flexible member 23 may be disposed tilted. In other words, the flexible wire is not parallel to the x axis, the y axis, or the z axis. In this way, when a flexible wire of an electrically controlled flexible member 23 exerts a force on the movable block 21, the force may be decomposed onto two axes. That is, a combined force exerted by an electrically controlled flexible member 23 may be decomposed into force components along two axes. Therefore, this reduces a quantity of electrically controlled flexible members 23.

Correspondingly, as shown in FIG. 1, an upper portion of each movable block 21 and the fastening brackets 22 on the two sides are connected by the electrically controlled flexible members 23, and a lower portion of each movable block 21 and the fastening brackets 22 on the two sides are connected by the electrically controlled flexible members 23. In other words, the actuating part 2 includes at least eight electrically controlled flexible members 23, and each movable block 21 is provided with at least four electrically controlled flexible members 23. In this case, there are a plurality of layout manners of the four electrically controlled flexible members 23 on each movable block 21. The following describes several of the layout manners. However, the following layout manners of the electrically controlled flexible members 23 are merely examples, and do not constitute any specific limitation.

Figure 8:
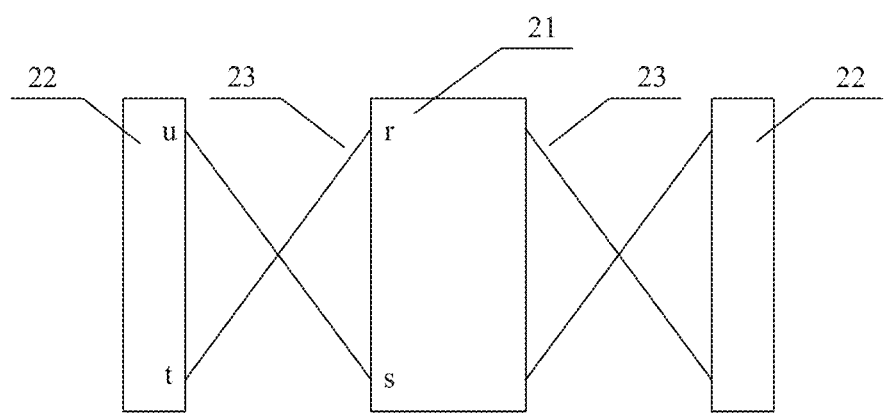
FIG. 8 is a schematic diagram of a connection relationship of an electrically controlled flexible member between a movable block and a fastening bracket according to an embodiment.
Figure 9:
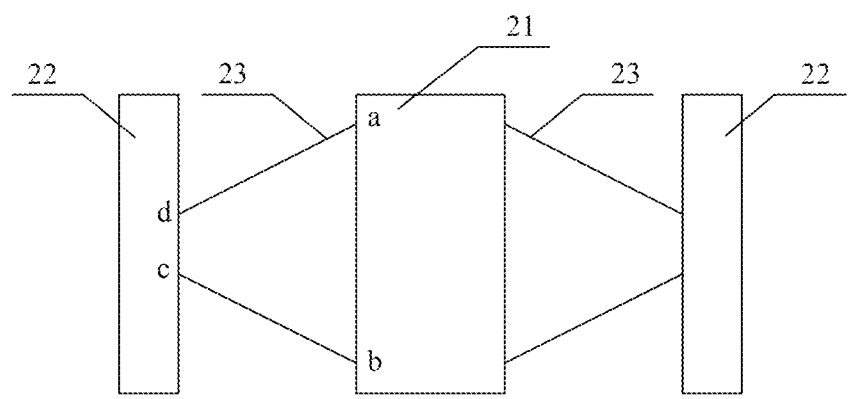
FIG. 9 is a schematic diagram of a connection relationship of an electrically controlled flexible member between a movable block and a fastening bracket according to an embodiment.

In an embodiment, as shown in FIG. 8 and FIG. 9, each electrically controlled flexible member 23 includes a movable block connector, a support connector, and a flexible wire connecting the movable block connector and the support connector. A height of a movable block connector located on the upper portion of the movable block 21 is higher than a height of a support connector of an electrically controlled flexible member 23 to which the movable block connector belongs, and a height of a movable block connector located on the lower portion of the movable block 21 is lower than a height of a support connector of an electrically controlled flexible member to which the movable block connector belongs.

In an embodiment, as shown in FIG. 8, a height of a movable block connector r is higher than a height of a support connector t, and a height of a movable block connector s is lower than a height of a support connector u. The movable block connector r is located on the upper portion of the movable block 21. A support connector of an electrically controlled flexible member 23 to which the movable block connector r belongs is the support connector t. The movable block connector s is located on the lower portion of the movable block 21. A support connector of an electrically controlled flexible member 23 to which the movable block connector s belongs is the support connector u.

Alternatively, as shown in FIG. 9, a height of a movable block connector a is higher than a height of a support connector d, and a height of a movable block connector b is lower than a height of a support connector c. The movable block connector a is located on the upper portion of the movable block 21. A support connector of an electrically controlled flexible member 23 to which the movable block connector a belongs is the support connector d. The movable block connector b is located on the lower portion of the movable block 21. A support connector of an electrically controlled flexible member 23 to which the movable block connector b belongs is the support connector c.

Heights of two support connectors located on a same fastening bracket 22 may not be limited. For example, the two support connectors located on the same fastening bracket 22 overlap. In other words, the heights of the two support connectors located on the same fastening bracket 22 are equal. To be specific, in FIG. 9, a height of the support connector d is equal to that of the support connector c.

For another example, in two support connectors located on a same fastening bracket 22, a height of a first support connector is higher than a height of a second support connector. The first support connector and a movable block connector located on the upper portion of the movable block 21 belong to a same electrically controlled flexible member 23. The second support connector and a movable block connector located on the lower portion of the movable block 21 belong to a same electrically controlled flexible member 23. To be specific, as shown in FIG. 9, a support connector d and a support connector c are located on a same fastening bracket 22, and a height of the support connector d is higher than that of the support connector c. A movable block connector a is located on the upper portion of the movable block 21, and the movable block connector a and the support connector d belong to a same electrically controlled flexible member 23. A movable block connector b is located on the lower portion of the movable block 21, and the movable block connector b and the support connector c belong to a same electrically controlled flexible member 23.

For another example, as shown in FIG. 1, in two support connectors located on a same fastening bracket 22, a height of a first support connector is lower than a height of a second support connector. The first support connector and a movable block connector located on the upper portion of the movable block 21 belong to a same electrically controlled flexible member 23. The second support connector and a movable block connector located on the lower portion of the movable block 21 belong to a same electrically controlled flexible member 23. To be specific, as shown in FIG. 8, a height of a support connector t is lower than a height of a support connector u. A movable block connector r is located on the upper portion of the movable block 21, and the movable block connector r and the support connector t belong to a same electrically controlled flexible member 23. A movable block connectors is located on the lower portion of the movable block 21, and the movable block connector s and the support connector u belong to a same electrically controlled flexible member 23.

Figure 11:
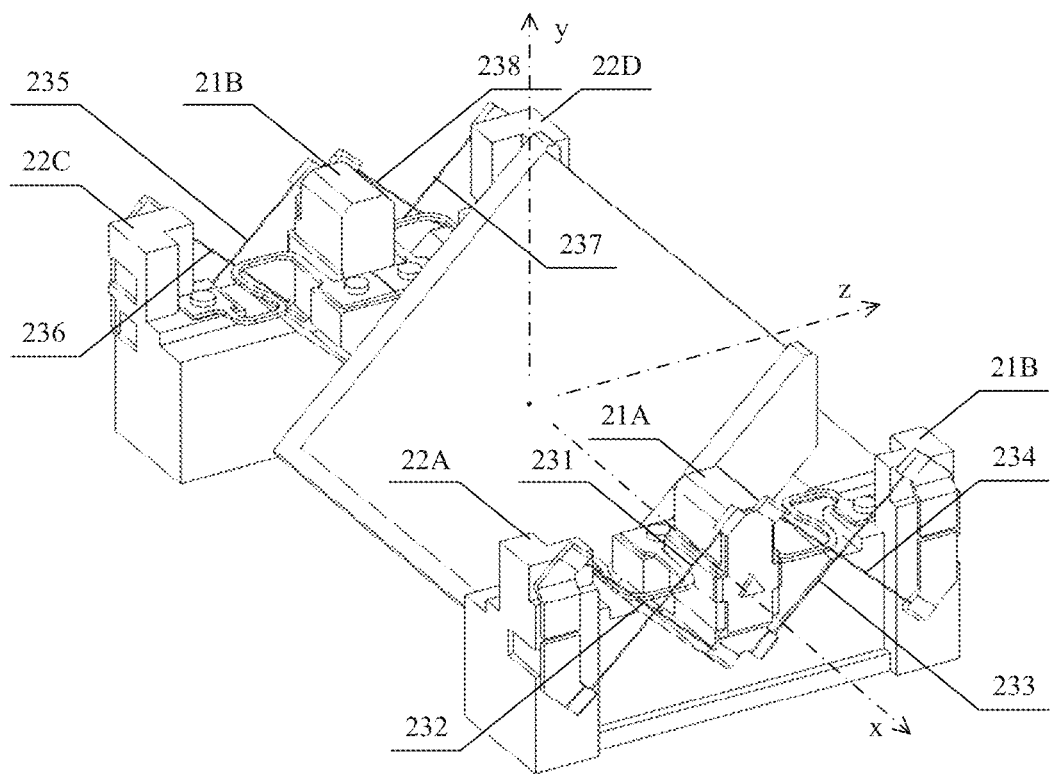
FIG. 11 is a schematic structural diagram of a camera module according to an embodiment.

In a case shown in FIG. 1 and FIG. 8 in which two electrically controlled flexible members 23 between the movable block 21 and a fastening bracket 22 on one side intersect, and the intersection is located between the movable block 21 and the fastening bracket 22, to prevent two intersecting flexible wires from interfering with each other during working, correspondingly, for two electrically controlled flexible members 23 between each movable block 21 and a fastening bracket 22 on one side, a flexible wire of an electrically controlled flexible member 23 connected to the upper portion of the movable block 21 is not in contact with a flexible wire of an electrically controlled flexible member 23 connected to the lower portion of the movable block 21. To be specific, as shown in FIG. 11, a plane in which a flexible wire of a first electrically controlled flexible member 231 and a flexible wire of a fourth electrically controlled flexible member 234 are located is parallel to a plane in which a flexible wire of a second electrically controlled flexible member 232 and a flexible wire of a third electrically controlled flexible member 233 are located, there is a gap between the two planes, and a value of the gap is a preset value. In this way, when the first electrically controlled flexible member 231 and the fourth electrically controlled flexible member 234 are powered on and contract, but the second electrically controlled flexible member 232 and the third electrically controlled flexible member 233 are not powered on and do not contract, the flexible wire of the second electrically controlled flexible member 232 does not interfere with a force exerted by the first electrically controlled flexible member 231 on the movable block 21, and the flexible wire of the third electrically controlled flexible member 233 does not interfere with a force exerted by the fourth electrically controlled flexible member 234 on the movable block 21.

Figure 10:
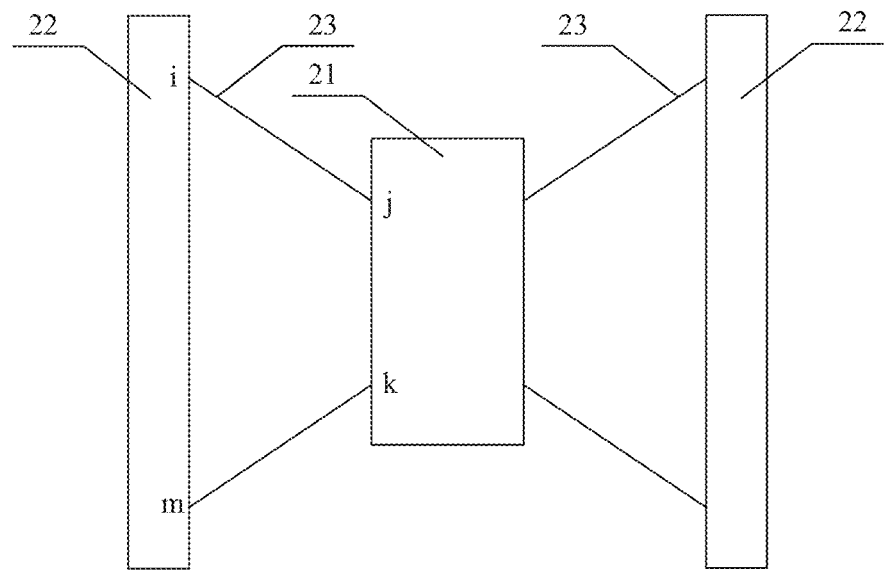
FIG. 10 is a schematic diagram of a connection relationship of an electrically controlled flexible member between a movable block and a fastening bracket according to an embodiment.

In examples as shown in FIG. 9 and FIG. 10, because there is no problem that flexible wires interfere with each other, flexible wires of two electrically controlled flexible members 23 located on the upper portion of the first movable block 21A and flexible wires of two electrically controlled flexible members 23 located on the lower portion of the first movable block 21A may be located in a same plane, denoted as a first plane. Flexible wires of two electrically controlled flexible members 23 located on the upper portion of the second movable block 21B and flexible wires of two electrically controlled flexible members 23 located on the lower portion of the second movable block 21B may be located in a same plane, denoted as a second plane. The first plane is parallel to the second plane.

With reference to FIG. 1, FIG. 2, FIG. 5, FIG. 8, and FIG. 9, a distribution characteristic of the electrically controlled flexible members 23 may be as follows: Flexible wires of two electrically controlled flexible members 23 between each movable block 21 and a fastening bracket 22 on one side intersect, and the intersection (which may be an intersection in a same plane or an intersection of different planes) falls on the fastening bracket 22, or falls between the fastening bracket 22 and the movable block 21, or falls on a side that is of the fastening bracket 22 and that is away from the movable block 21.

In an embodiment, in another possible manner of the specific layout of the four electrically controlled flexible members 23 on each movable block 21, as shown in FIG. 10, a height of a movable block connector located on the upper portion of the movable block 21 is lower than a height of a support connector of an electrically controlled flexible member 23 to which the movable block connector belongs, and a height of a movable block connector located on the lower portion of the movable block 21 is higher than a height of a support connector of an electrically controlled flexible member 23 to which the movable block connector belongs.

In an embodiment, as shown in FIG. 10, a height of a movable block connector j is lower than a height of a support connector i. The movable block connector j is located on the upper portion of the movable block. A support connector of an electrically controlled flexible member 23 to which the movable block connector j belongs is the support connector i. A height of a movable block connector k is higher than a height of a support connector m. The movable block connector k is located on the lower portion of the movable block. A support connector of an electrically controlled flexible member 23 to which the movable block connector k belongs is the support connector m.

In FIG. 1, FIG. 2, FIG. 5, FIG. 8, and FIG. 9, the flexible wire of the electrically controlled flexible member 23 located on the upper portion of the movable block 21 tilts downward, and the flexible wire of the electrically controlled flexible member 23 located on the lower portion of the movable block 21 tilts upward. In FIG. 10, the flexible wire of the electrically controlled flexible member 23 located on the upper portion of the movable block 21 tilts upward, and the flexible wire of the electrically controlled flexible member 23 located on the lower portion of the movable block 21 tilts downward.

It should be noted that FIG. 8 to FIG. 10 are schematic connection diagrams of electrically controlled flexible members 23 between one of the movable blocks 21 and fastening brackets 22 on two sides of the movable block 21, and schematic connection diagrams of electrically controlled flexible members 23 between the other movable block 21 and fastening brackets 22 on two sides of the movable block 21 are similar thereto, and are not shown again.

To facilitate control of the processor on the electrically controlled flexible members 23, correspondingly, as shown in FIG. 1, FIG. 2, FIG. 5, and FIG. 8 to FIG. 11, for each movable block 21, electrically controlled flexible members 23 on two sides of the movable block 21 are symmetric. For example, as shown in FIG. 11, a first electrically controlled flexible member 231 and a fourth electrically controlled flexible member 234 are symmetric relative to a y axis, and a second electrically controlled flexible member 232 and a third electrically controlled flexible member 233 are symmetric relative to the y axis. A plane in which flexible wires of electrically controlled flexible members 23 that are on the upper portion of the movable block 21 and that are respectively connected to the fastening brackets 22 on the two sides are located is parallel to a plane in which flexible wires of electrically controlled flexible members 23 that are on the lower portion of the movable block 21 and that are respectively connected to the fastening brackets 22 on the two sides are located. To be specific, as shown in FIG. 11, a plane in which the first electrically controlled flexible member 231 and the fourth electrically controlled flexible member 234 are located is parallel to a plane in which the second electrically controlled flexible member 232 and the third electrically controlled flexible member 233 are located.

When the flexible wire of the electrically controlled flexible member 23 is an SMA wire, four SMA wires between the movable block 21 and the fastening brackets 22 are disposed in a cross manner, in other words, in a layout manner of SMA wires of electrically controlled flexible members 23 shown in FIG. 1, FIG. 2, FIG. 5, FIG. 8, and FIG. 11, so that rotation of the lens optical device 1 can be better controlled, and arrangement space can be reduced. This is because the SMA wire usually has a relatively small deformation amount. To increase the deformation amount of the SMA wire without damaging the SMA wire, the SMA wire needs to be long enough. In same occupied space, compared with layout manners in FIG. 9 and FIG. 10, the layout manner of SMA wires in FIG. 1, FIG. 2, FIG. 5, FIG. 8, and FIG. 11 allows the SMA wire to be longer. Therefore, in the layout manner of the SMA wires of the electrically controlled flexible members 23 shown in FIG. 1, FIG. 2, FIG. 5, FIG. 8, and FIG. 11, rotation of the lens optical device 1 can be better controlled, and arrangement space can be reduced.

It should be noted that, a person skilled in the art may flexibly select a proper layout manner of the electrically controlled flexible members 23 based on an actual space area and an effect that is expected to be achieved. The layout manners of the electrically controlled flexible members 23 shown in the figures are merely examples, and do not constitute any specific limitation.

The foregoing describes a structure of the camera module. The following describes in detail a process of rotating the lens optical device 1 by using the foregoing structure.

First, a principle of rotating the lens optical device 1 around the x axis, the y axis, and the z axis is described.

For ease of description, as shown in FIG. 11, the two movable blocks 21 may be denoted as a first movable block 21A and a second movable block 21B respectively, fastening brackets 22 on two sides of the first movable block 21A are denoted as a first fastening bracket 22A and a second fastening bracket 22B respectively, fastening brackets 22 on two sides of the first movable block 21B are denoted as a third fastening bracket 22C and a fourth fastening bracket 22D respectively, electrically controlled flexible members 23 between the first movable block 21A and the first fastening bracket 22A are denoted as a first electrically controlled flexible member 231 and a second electrically controlled flexible member 232 respectively, electrically controlled flexible members 23 between the first movable block 21A and the second fastening bracket 22B are denoted as a third electrically controlled flexible member 233 and a fourth electrically controlled flexible member 234 respectively, electrically controlled flexible members 23 between the second movable block 21B and the third fastening bracket 22 C are denoted as a fifth electrically controlled flexible member 235 and a sixth electrically controlled flexible member 236 respectively, and electrically controlled flexible members 23 between the second movable block 21B and the fourth fastening bracket 22D are denoted as a seventh electrically controlled flexible member 237 and an eighth electrically controlled flexible member 238 respectively.

When the first electrically controlled flexible member 231, in an embodiment, the third electrically controlled flexible member 233, the fifth electrically controlled flexible member 235, and the seventh electrically controlled flexible member 237 are powered on, their flexible wires contract, so that the two movable blocks 21 drive the lens optical device 1 to rotate around the x axis in a first direction. The first direction may be either clockwise or counterclockwise. When the second electrically controlled flexible member 232, the fourth electrically controlled flexible member 234, the sixth electrically controlled flexible member 236, and the eighth electrically controlled flexible member 238 are powered on, their flexible wires contract, so that the two movable blocks 21 drive the lens optical device 1 to rotate around the x axis in a second direction opposite to the first direction.

When the third electrically controlled flexible member 233, in an embodiment, the fourth electrically controlled flexible member 234, the fifth electrically controlled flexible member 235, and the sixth electrically controlled flexible member 236 are powered on, their flexible wires contract, so that the two movable blocks 21 drive the lens optical device 1 to rotate around the y axis in a first direction, the first direction may be either clockwise or counterclockwise. When the first electrically controlled flexible member 231, the second electrically controlled flexible member 232, the seventh electrically controlled flexible member 237, and the eighth electrically controlled flexible member 238 are powered on, their flexible wires contract, so that the two movable blocks 21 drive the lens optical device 1 to rotate around the y axis in a second direction opposite to the first direction.

When the first electrically controlled flexible member 231, in an embodiment, the fourth electrically controlled flexible member 234, the sixth electrically controlled flexible member 236, and the seventh electrically controlled flexible member 237 are powered on, their flexible wires contract, so that the two movable blocks 21 drive the lens optical device 1 to rotate around the z axis in a first direction. The first direction may be either clockwise or counterclockwise. When the second electrically controlled flexible member 232, the third electrically controlled flexible member 233, the fifth electrically controlled flexible member 235, and the eighth electrically controlled flexible member 238 are powered on, their flexible wires contract, so that the two movable blocks 21 drive the lens optical device 1 to rotate around the z axis in a second direction opposite to the first direction.

The foregoing describes a case in which the lens optical device 1 rotates around any one of the x axis, the y axis, and the z axis. If an actual rotation axis is not parallel to the three coordinate axes, the actual rotation axis may be decomposed into components on the three coordinate axes, and the lens optical device 1 rotates around at least one of the x axis, the y axis, and the z axis. Alternatively, the electrically controlled flexible members 23 may be controlled to be supplied with currents of different values, so that the lens optical device 1 may rotate around any axis in a xyz spatial coordinate system.

It should be noted that, to avoid a problem of interference caused by an electrically controlled flexible member 23 that is not powered on to an electrically controlled flexible member 23 powered on when the lens optical device 1 rotates around an axis, correspondingly, when not powered on, a flexible wire of the electrically controlled flexible member 23 may be in a relaxed state.

In addition, to prevent a relatively fast rotation speed of the lens optical device 1 caused by sudden power-on of an electrically controlled flexible member 23, correspondingly, when detecting that the terminal device performs photographing processing and an image stabilization function of the terminal device is enabled, the processor may control a power supply part of the camera module to precharge all the electrically controlled flexible members 23, to be specific, supply a small current to all the electrically controlled flexible members 23. When several electrically controlled flexible members 23 need to work, the processor further controls the power supply part of the camera module to supply a large current to the several electrically controlled flexible members 23. For example, when the processor controls the power supply part of the camera module to precharge all the electrically controlled flexible members 23, an SMA wire of each electrically controlled flexible member 23 is supplied with a current of 1 ampere. When an SMA wire of the first electrically controlled flexible member 231 needs to contract, the processor controls the power supply part of the camera module to supply a current of 10 amperes to the SMA wire of the first electrically controlled flexible member 231.

In this way, a non-working electrically controlled flexible member 23 not working may generate resistance to a working electrically controlled flexible member 23, to prevent excessive compensation caused when the lens optical device 1 suddenly rotates.

The foregoing describes a process of rotating the lens optical device 1 around a rotation axis. The following describes in detail a specific process of controlling the lens optical device 1 to rotate around a rotation axis.

Figure 12:
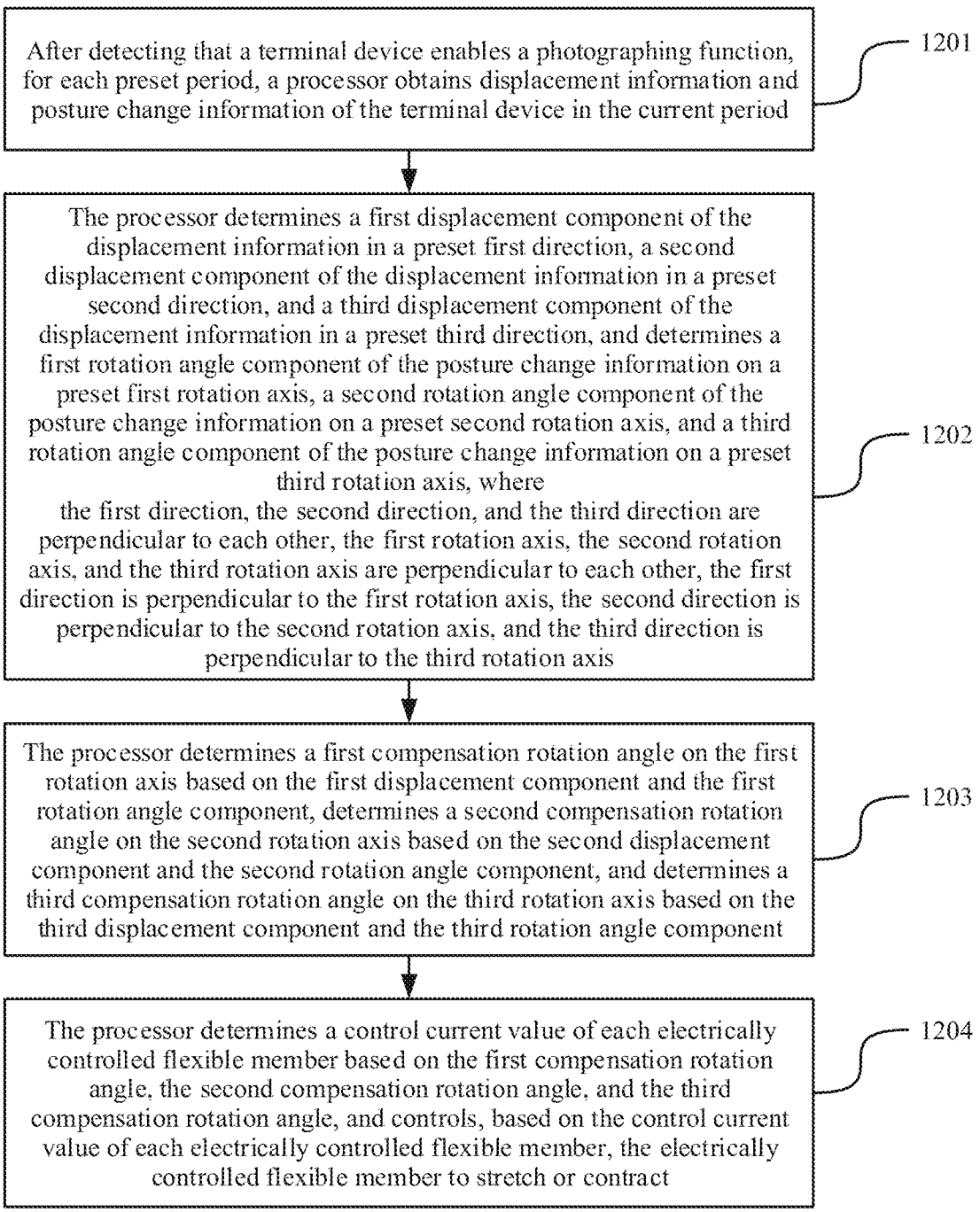
FIG. 12 is a schematic flowchart of a control method of electrically controlled flexible members according to an embodiment.

Based on the foregoing description, the camera module further includes a processor. The processor is electrically connected to each electrically controlled flexible member 23. A specific control process of the processor may be performed according to a process shown in FIG. 12.

In operation 1201, after detecting that the terminal device enables the photographing function, for each preset period, the processor obtains displacement information and posture change information of the terminal device in the current period.

As described above, the displacement information is information about a change of a location of the terminal device in a plane, and the posture change information is a rotation change of the terminal device in space, for example, rotating a specific angle around an axis. A shake of the terminal device is uncertain, and a shake amount is a result combing the displacement information and the posture change information.

In operation 1202, the processor determines a first displacement component of the displacement information in a preset first direction, a second displacement component of the displacement information in a preset second direction, and a third displacement component of the displacement information in a preset third direction, and determines a first rotation angle component of the posture change information on a preset first rotation axis, a second rotation angle component of the posture change information on a preset second rotation axis, and a third rotation angle component of the posture change information on a preset third rotation axis.

The first direction, the second direction, and the third direction are perpendicular to each other, the first rotation axis, the second rotation axis, and the third rotation axis are perpendicular to each other, the first direction is perpendicular to the first rotation axis, the second direction is perpendicular to the second rotation axis, and the third direction is perpendicular to the third rotation axis.

For example, if it is assumed that an x axis in a three-dimensional coordinate system is used as the first rotation axis, a y axis is used as the second rotation axis, and a z axis is used as the third rotation axis, correspondingly the first direction is a y-axis positive direction or a z-axis positive direction, the second direction is an x-axis positive direction or the z-axis positive direction, and the third direction is the x-axis positive direction or the y-axis positive direction. Further, as the first direction, the second direction, and the third direction are perpendicular to each other, if the first direction is the y-axis positive direction, the third direction is the x-axis positive direction, and the second direction is the z-axis positive direction.

The first displacement component, the second displacement component, and the third displacement component are vectors that have positive and negative signs, and the positive and negative signs represent translation directions. For example, the first displacement component in the first direction is either along the first direction or along a direction opposite to the first direction. Similarly, the first rotation angle component, the second rotation angle component, and the third rotation angle component also have positive and negative signs, and the positive and negative signs represent rotation directions. For example, the first rotation angle component on the first rotation axis is either an angle clockwise around the first rotation axis or an angle counterclockwise around the first rotation axis.

In an embodiment, if the terminal device is translated in the first direction, the lens optical device 1 needs to rotate around an axis perpendicular to the first direction, to compensate for the translation of the terminal device in the first direction. For example, if the terminal device is translated in a y-axis direction, the lens optical device 1 needs to rotate around the x axis. Whether the lens optical device 1 rotates around the x axis clockwise or counterclockwise needs to be determined depending on whether a displacement component of the terminal device on the y axis is a positive value or a negative value.

In operation 1203, the processor determines a first compensation rotation angle on the first rotation axis based on the first displacement component and the first rotation angle component, determines a second compensation rotation angle on the second rotation axis based on the second displacement component and the second rotation angle component, and determines a third compensation rotation angle on the third rotation axis based on the third displacement component and the third rotation angle component.

A rotation angle and a compensation rotation angle are opposite to each other, directions of the two angles are opposite, and values of the two angles are equal. For example, the rotation angle is an angle clockwise around a rotation axis, and the compensation rotation angle is an angle counterclockwise around the rotation axis.

In an embodiment, the processor determines a corresponding first displacement rotation angle based on the first displacement component, then performs a vector operation on the first displacement rotation angle and the first rotation angle component, and after the vector operation, obtains an opposite number for an obtained angle, to obtain the first compensation rotation angle on the first rotation axis. For example, if rotation directions of the two angles are consistent, an addition operation is performed; if rotation directions of the two angles are opposite, a subtraction operation is performed. In this way, an angle β may be obtained after the vector operation. Then the processor determines a negative β as a compensation rotation angle, to obtain the first compensation rotation angle on the first rotation axis. Similarly, the processor determines a corresponding second displacement compensation rotation angle based on the second displacement component, and then performs a vector operation on the second displacement compensation rotation angle and the second rotation angle component, to obtain the second compensation rotation angle on the second rotation axis. The processor determines a corresponding third displacement compensation rotation angle based on the third displacement component, and then performs a vector operation on the third displacement compensation rotation angle and the third rotation angle component, to obtain the third compensation rotation angle on the third rotation axis.

In operation 1204, the processor determines a control current value of each electrically controlled flexible member 23 based on the first compensation rotation angle, the second compensation rotation angle, and the third compensation rotation angle, and controls, based on the control current value of each electrically controlled flexible member 23, the electrically controlled flexible member 23 to stretch or contract.

Referring to FIG. 11 again, an example that the x axis represents the first rotation axis, the y axis represents the second rotation axis, and the z axis represents the third rotation axis is used.

In an embodiment, if the first compensation rotation angle is not zero, the processor controls, by using the actuating part 2, the lens optical device 1 to rotate around the first rotation axis by the first compensation rotation angle. Specifically, the processor may control the power supply part of the camera module to supply a current used for stretching or contraction to the first electrically controlled flexible member 231, the third electrically controlled flexible member 233, the fifth electrically controlled flexible member 235, and the seventh electrically controlled flexible member 237; or supply a current used for stretching or contraction to the second electrically controlled flexible member 232, the fourth electrically controlled flexible member 234, the sixth electrically controlled flexible member 236, and the eighth electrically controlled flexible member 238, which is determined based on a direction of the first compensation rotation angle. Similarly, if the second compensation rotation angle is not zero, the processor controls, by using the actuating part 2, the lens optical device 1 to rotate around the second rotation axis by the second compensation rotation angle. Specifically, the processor may control the power supply part of the camera module to supply a current used for stretching or contraction to the third electrically controlled flexible member 233, the fourth electrically controlled flexible member 234, the fifth electrically controlled flexible member 235, and the sixth electrically controlled flexible member 236; or supply a current used for stretching or contraction to the first electrically controlled flexible member 231, the second electrically controlled flexible member 232, the seventh electrically controlled flexible member 237, and the eighth electrically controlled flexible member 238, which is determined based on a direction of the second compensation rotation angle. If the third compensation rotation angle is not zero, the processor controls, by using the actuating part 2, the lens optical device 1 to rotate around the third rotation axis by the third compensation rotation angle. Specifically, the processor may control the power supply part of the camera module to supply a current used for stretching or contraction to the first electrically controlled flexible member 231, the fourth electrically controlled flexible member 234, the sixth electrically controlled flexible member 236, and the seventh electrically controlled flexible member 237; or supply a current used for stretching or contraction to the second electrically controlled flexible member 232, the third electrically controlled flexible member 233, the fifth electrically controlled flexible member 235, and the eighth electrically controlled flexible member 238, which is determined based on a direction of the third compensation rotation angle.

For example, for an example that the SMA wires of the first electrically controlled flexible member 231, the third electrically controlled flexible member 233, the fifth electrically controlled flexible member 235, and the seventh electrically controlled flexible member 237 contract, the processor may control the power supply part of the camera module to supply a current of 10 amperes to the first electrically controlled flexible member 231, supply a current of 1 ampere to the second electrically controlled flexible member 232, supply a current of 10 amperes to the third electrically controlled flexible member 233, supply a current of 1 ampere to the fourth electrically controlled flexible member 234, supply a current of 10 amperes to the fifth electrically controlled flexible member 235, supply a current of 1 ampere to the sixth electrically controlled flexible member 236, supply a current of 10 amperes to the seventh electrically controlled flexible member 237, and supply a current of 1 ampere to the eighth electrically controlled flexible member 238.

In the embodiments of this disclosure, the camera module of the terminal device may include a lens optical device and an actuating part. The actuating part includes two movable blocks, fastening brackets located on two sides of each movable block, and a plurality of electrically controlled flexible members. The lens optical device is located between the two movable blocks and is fastened on the two movable blocks. Each movable block is suspended on the fastening brackets by using elastic members. Each movable block and the fastening brackets on the two sides are connected by the electrically controlled flexible members. In this way, when the terminal device having the camera module is used to perform photographing, a processor of the terminal device may control, based on a location change status and a rotation status that are generated when the terminal device is shaken, the electrically controlled flexible members to stretch or contract to push or pull the movable blocks to move, so that the movable blocks can drive the lens optical device to rotate in space. This actuating part for adjusting the lens optical device has a relatively good actuating effect, thereby improving an image stabilization effect of the terminal device having the actuating part.

Figure 13:
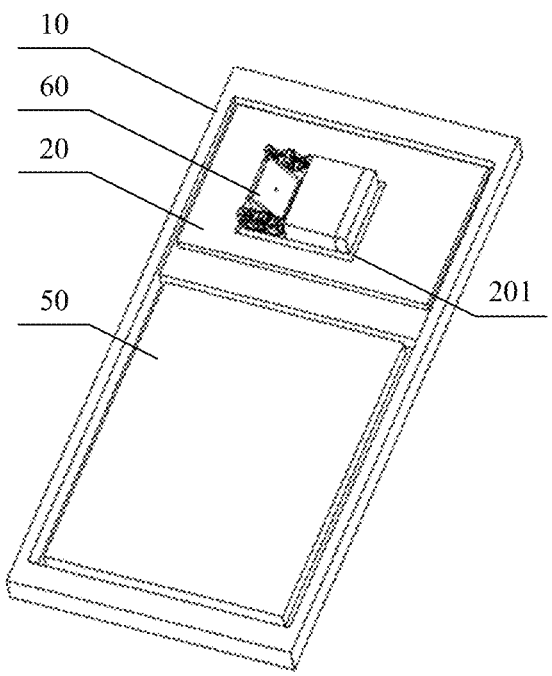
FIG. 13 is a schematic structural diagram of a terminal device according to an embodiment.
Figure 14:
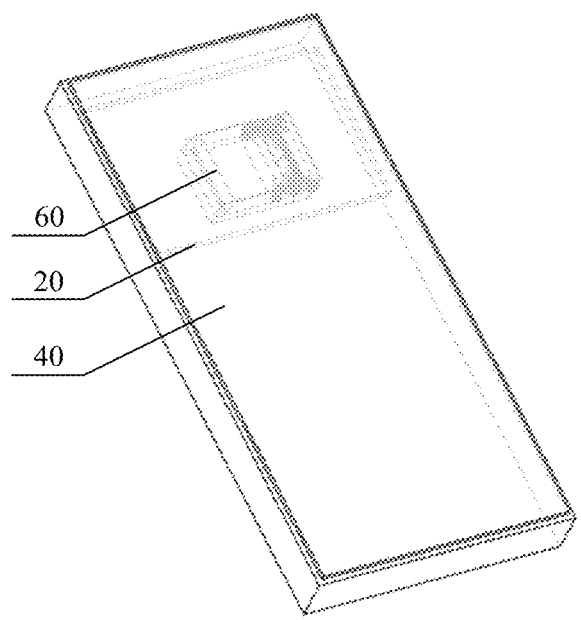
FIG. 14 is a schematic structural diagram of a terminal device according to an embodiment.
Figure 15:
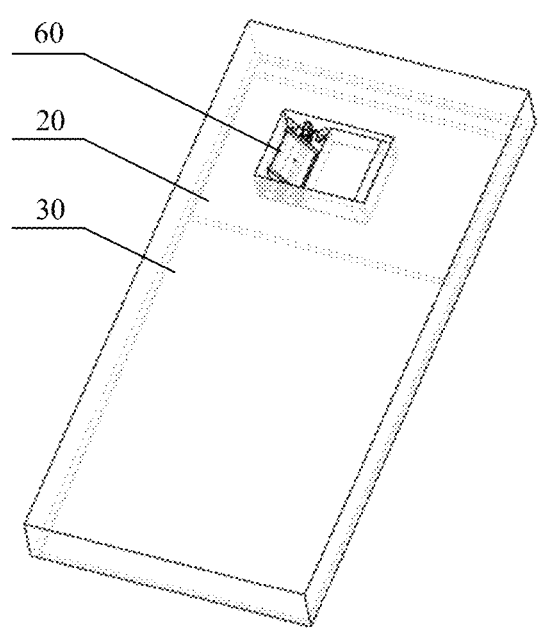
FIG. 15 is a schematic structural diagram of a terminal device according to an embodiment.

An embodiment of the present disclosure further provides a terminal device. The terminal device may be a mobile phone, a tablet computer, a camera, or the like. As shown in FIG. 13 to FIG. 15 (a mobile phone may be used as an example in the accompanying drawings), the terminal device may include a middle frame 10, a mainboard 20, a rear cover 30, a display screen 40, a battery 50, and the foregoing camera module (denoted as a camera module 60 in the figure). As shown in FIG. 13, the mainboard 20, the battery 50, and the camera module 60 are all mounted on the middle frame 10. As shown in FIG. 14, the display screen 40 is mounted on a first surface of the middle frame 10. As shown in FIG. 15, the rear cover 30 is mounted on a second surface of the middle frame 10. The first surface is opposite to the second surface, the mainboard 20 is electrically connected to the display screen 40, the battery 50, and the camera module 60.

In an embodiment, the middle frame 10 is a main frame of the terminal device, and is configured to carry components and parts of the terminal device. The mainboard 20, the battery 50, the camera module 60, the rear cover 30, and the display screen 40 may all be mounted on the middle frame 10. For example, for the mobile phone, generally, as shown in FIG. 13, the mainboard 20 may be mounted at a top portion of the middle frame 10, and the battery 50 is mounted at a middle portion of the middle frame 10. It should be noted that mounting positions of the mainboard 20 and the battery 50 on the middle frame 10 may be flexibly set based on an actual layout inside the terminal device, and the mounting positions of the mainboard 20 and the battery 50 are not limited in this embodiment.

The camera module 60 of the terminal device may be mounted on the mainboard 20, or may be mounted on the middle frame 10. Because the mainboard 20 has a specific thickness, and the camera module 60 has a specific height, if the camera module 60 is directly mounted on the mainboard, the thickness of the terminal device is increased. In this case, to reduce the thickness of the terminal device, the camera module 60 may be mounted on the middle frame 10. Specifically, as shown in FIG. 13, a mounting hole 201 matching the camera module 60 may be disposed on the mainboard 20. The camera module 60 may be located in the mounting hole 201 and mounted on the middle frame 10. For example, a bracket for mounting the camera module 60 is disposed on the middle frame 10. The bracket may be located in the mounting hole 201. In this way, the camera module 60 is mounted on the bracket, and the bracket is located in the mounting hole 201. It should be noted that a mounting manner and a mounting position of the camera module 60 inside the terminal device may be flexibly set according to a specific layout manner inside the terminal device, and this is not limited in this embodiment.

As shown in FIG. 14 and FIG. 15, the display screen 40 and the rear cover 30 are respectively mounted on two opposite surfaces of the middle frame 10. For example, the display screen 40 is mounted on a first surface of the middle frame 10, and the rear cover 30 is mounted on a second surface of the middle frame 10. The first surface is opposite to the second surface. For example, for a mobile phone, a tablet computer, or the like, the display screen 40 may be mounted on a front side of the middle frame 10, and the rear cover 30 may be mounted on a rear side of the middle frame 10.

In an electrical connection relationship, the mainboard 20 is electrically connected to the display screen 40, the battery 50, and the camera module 60, and the battery 50 is electrically connected to the display screen 40 and the camera module 60, and is configured to supply power to the display screen 40 and the camera module 60.

As described above, the camera module of the terminal device may include a lens optical device and an actuating part. The actuating part includes two movable blocks, fastening brackets located on two sides of each movable block, and a plurality of electrically controlled flexible members. The lens optical device is located between the two movable blocks and is fastened on the two movable blocks. Each movable block is suspended on the fastening brackets by using elastic members. Each movable block and the fastening brackets on the two sides are connected by the electrically controlled flexible members. In this way, when the terminal device with the camera module is used for photographing, a processor of the terminal device may control, based on a location change status and a rotation status that are generated when the terminal device is shaken, the electrically controlled flexible members to stretch or contract to push or pull the movable blocks to move, so that the movable blocks can drive the lens optical device to rotate in space. This actuating part for adjusting the lens optical device has a relatively good actuating effect, thereby improving an image stabilization effect of the terminal device with the actuating part.

The foregoing descriptions are merely one embodiment of the present disclosure, but are not intended to limit this application. Any modification, equivalent replacement, or improvement made without departing from the spirit and principle of this application should fall within the protection scope of this application.

What is claimed is:

1. A camera module, comprising:
an actuating part having two movable blocks, fastening brackets located on two sides of each of the movable blocks, and a plurality of electrically controlled flexible members; and
a lens optical device located between the two movable blocks, and is fastened on the two movable blocks,
wherein each movable block is suspended on the fastening brackets by using elastic members, and
wherein each movable block and the fastening brackets on the two sides of the movable block are connected by the electrically controlled flexible members.

2. The camera module according to claim 1, wherein an upper portion of each movable block and the fastening brackets on the two sides of the movable block are connected by at least one of the electrically controlled flexible members, and a lower portion of each movable block and the fastening brackets on the two sides of the movable block are connected by at least one of the electrically controlled flexible members.

3. The camera module according to claim 2, wherein each electrically controlled flexible member comprises a movable block connector, a support connector, and a flexible wire connecting the movable block connector and the support connector; and a height of a movable block connector located on the upper portion of the movable block is higher than a height of a support connector of an electrically controlled flexible member to which the movable block connector belongs, and a height of a movable block connector located on the lower portion of the movable block is lower than a height of a support connector of an electrically controlled flexible member to which the movable block connector belongs.

4. The camera module according to claim 3, wherein in two support connectors located on a same fastening bracket, a height of a first support connector is lower than a height of a second support connector, wherein the first support connector and a movable block connector located on the upper portion of the movable block belong to a same electrically controlled flexible member, and the second support connector and a movable block connector located on the lower portion of the movable block belong to a same electrically controlled flexible member.

5. The camera module according to claim 4, wherein for two electrically controlled flexible members between each movable block and a fastening bracket on one side, a flexible wire of an electrically controlled flexible member connected to the upper portion of the movable block is not in contact with a flexible wire of an electrically controlled flexible member connected to the lower portion of the movable block.

6. The camera module according to claim 3, wherein the flexible wire comprises a shape memory alloy wire.

7. The camera module according to claim 6, wherein each elastic member is a metal elastic member, each movable block connector and each support connector are conductive terminals, and each elastic member is electrically connected to a movable block connector on a same side.

8. The camera module according to claim 2, wherein each electrically controlled flexible member comprises a movable block connector, a support connector, and a flexible wire connecting the movable block connector and the support connector; and a height of a movable block connector located on the upper portion of the movable block is lower than a height of a support connector of an electrically controlled flexible member to which the movable block connector belongs, and a height of a movable block connector located on the lower portion of the movable block is higher than a height of a support connector of an electrically controlled flexible member to which the movable block connector belongs.

9. The camera module according to claim 2, further comprising a processor coupled to each electrically controlled flexible member, configured to:

after detecting that a photographing function of a terminal device is enabled, for each preset period, obtain displacement information and posture change information of the terminal device in a current period;

determine a first displacement component of the displacement information in a first direction, a second displacement component of the displacement information in a second direction, and a third displacement component of the displacement information in a third direction, wherein the first direction, the second direction, and the third direction are perpendicular to each other;

determine a first rotation angle component of the posture change information on a first rotation axis, a second rotation angle component of the posture change information on a second rotation axis, and a third rotation angle component of the posture change information on a third rotation axis, wherein the first rotation axis, the second rotation axis, and the third rotation axis are perpendicular to each other, wherein the first direction is perpendicular to the first rotation axis, the second direction is perpendicular to the second rotation axis, and the third direction is perpendicular to the third rotation axis;

determine a first compensation rotation angle on the first rotation axis based on the first displacement component and the first rotation angle component, determine a second compensation rotation angle on the second rotation axis based on the second displacement component and the second rotation angle component, and determine a third compensation rotation angle on the third rotation axis based on the third displacement component and the third rotation angle component; and determine a control current value of each electrically controlled flexible member based on the first compensation rotation angle, the second compensation rotation angle, and the third compensation rotation angle, and control, based on the control current value of each electrically controlled flexible member, the electrically controlled flexible member to stretch or contract.

10. The camera module according to claim 1, wherein elastic members on the two sides of each movable block are symmetric relative to a plumb line of the movable block.

11. The camera module according to claim 1, wherein the lens optical device comprises a reflector mounted on a reflector mounting base that is located between the two movable blocks and is fastened on the two movable blocks.

12. The camera module according to claim 11, wherein the actuating part further comprises an elastic limiting member; and two ends of the elastic limiting member are respectively fastened on two fastening brackets, and a middle portion of the elastic limiting member is fastened on the reflector mounting base.

13. The camera module according to claim 1, further comprising a processor coupled to each electrically controlled flexible member, configured to:

after detecting that a photographing function of a terminal device is enabled, for each preset period, obtain displacement information and posture change information of the terminal device in a current period;

determine a control current value of each electrically controlled flexible member based on the displacement information and the posture change information; and control, based on the control current value of each electrically controlled flexible member, the electrically controlled flexible member to stretch or contract.

14. A terminal device, comprising:

a middle frame having a mainboard, a battery, and a camera module mounted thereon;

a display screen mounted on a first surface of the middle frame;

a rear cover mounted on a second surface of the middle frame opposite to the first surface, wherein the camera module comprises:

an actuating part having two movable blocks, fastening brackets located on two sides of each of the movable blocks, and a plurality of electrically controlled flexible members; and a lens optical device located between the two movable blocks, and is fastened on the two movable blocks, wherein each movable block is suspended on the fastening brackets by using elastic members, and wherein each movable block and the fastening brackets on the two sides of the movable block are connected by the electrically controlled flexible members.

15. The terminal device according to claim 14, wherein an upper portion of each movable block and the fastening brackets on the two sides of the movable block are connected by at least one of the electrically controlled flexible members, and a lower portion of each movable block and the fastening brackets on the two sides of the movable block are connected by at least one of the electrically controlled flexible members.

16. The terminal device according to claim 15, wherein each electrically controlled flexible member comprises a movable block connector, a support connector, and a flexible wire connecting the movable block connector and the support connector; and a height of a movable block connector located on the upper portion of the movable block is higher than a height of a support connector of an electrically controlled flexible member to which the movable block connector belongs, and a height of a movable block connector located on the lower portion of the movable block is lower than a height of a support connector of an electrically controlled flexible member to which the movable block connector belongs.

17. The terminal device according to claim 16, wherein in two support connectors located on a same fastening bracket, a height of a first support connector is lower than a height of a second support connector, wherein the first connector and a movable block connector located on the upper portion of the movable block belong to a same electrically controlled flexible member, and the second support connector and a movable block connector located on the lower portion of the movable block belong to a same electrically controlled flexible member.

18. The terminal device according to claim 17, wherein for two electrically controlled flexible members between each movable block and a fastening bracket on one side, a flexible wire of an electrically controlled flexible member connected to the upper portion of the movable block is not in contact with a flexible wire of an electrically controlled flexible member connected to the lower portion of the movable block.

19. The terminal device according to claim 16, wherein the flexible wire comprises a shape memory alloy wire.

20. The terminal device according to claim 15, wherein each electrically controlled flexible member comprises a movable block connector, a support connector, and a flexible wire connecting the movable block connector and the support connector; and a height of a movable block connector located on the upper portion of the movable block is lower than a height of a support connector of an electrically controlled flexible member to which the movable block connector belongs, and a height of a movable block connector located on the lower portion of the movable block is higher than a height of a support connector of an electrically controlled flexible member to which the movable block connector belongs.

* * * * *